(12) United States Patent  
Singh et al.

(10) Patent No.: US 8,738,029 B2  
(45) Date of Patent: *May 27, 2014

(54) METHODS, SYSTEMS, AND COMPUTER PROGRAM PRODUCTS FOR ROLE- AND LOCALE-BASED MOBILE USER DEVICE FEATURE CONTROL

(75) Inventors: Munindar P. Singh, Cary, NC (US); Mona Singh, Cary, NC (US)

(73) Assignee: Armstrong, Quinton Co. LLC, Wilmington, DE (US)

( * ) Notice: Subject to any disclaimer, the term of this patent is extended or adjusted under 35 U.S.C. 154(b) by 12 days.

This patent is subject to a terminal disclaimer.

(21) Appl. No.: 13/401,367

(22) Filed: Feb. 21, 2012

(65) Prior Publication Data

US 2012/0149337 A1    Jun. 14, 2012

Related U.S. Application Data

(63) Continuation of application No. 11/172,595, filed on Jun. 30, 2005, now Pat. No. 8,145,241.

(51) Int. Cl.

| | | |
|---|---|---|
| *H04W 24/00* | (2009.01) | |
| *H04W 4/00* | (2009.01) | |
| *H04B 1/38* | (2006.01) | |
| *H04M 3/42* | (2006.01) | |

(52) U.S. Cl.  
USPC ............... 455/456.1; 455/414.1; 455/422.1; 455/456.2; 455/456.3; 455/456.4; 455/456.5; 455/560

(58) Field of Classification Search  
CPC ....... H04W 12/06; H04W 4/02; H04W 24/02; H04W 4/025; H04W 4/16  
USPC ............ 455/456.1, 422.1, 560, 550.1, 456.4, 455/456.2, 456.3, 456.5, 414.1  
See application file for complete search history.

(56) References Cited

U.S. PATENT DOCUMENTS

| | | |
|---|---|---|
| 5,715,487 A | 2/1998 | McIntyre et al. |
| 6,011,973 A | 1/2000 | Valentine et al. |

(Continued)

FOREIGN PATENT DOCUMENTS

| | | |
|---|---|---|
| JP | 2000333266 A | 11/2000 |
| JP | 2004120530 A | 4/2004 |

(Continued)

*Primary Examiner* — Inder Mehra  
(74) *Attorney, Agent, or Firm* — Novak Druce Connolly Bove + Quigg LLP (57) ABSTRACT

Methods, systems, and computer program products for role- and locale-based mobile user device feature control are disclosed. According to one aspect, a method for controlling at least one feature of a mobile user device based on a locale and a role of a user of the mobile user device is disclosed. The method includes storing, in a database, role information defining a plurality of different roles assigned to different user types and corresponding locale-based mobile user device feature control policies. In response to a mobile user device being within the locale, a role of the mobile user device is determined. A policy corresponding to the role is selected from a database. At least one feature of the mobile user device is controlled based on the locale-based feature control policy.

24 Claims, 9 Drawing Sheets

(56) References Cited

U.S. PATENT DOCUMENTS

| | | |
|---|---|---|
| 6,085,096 A | 7/2000 | Nakamura |
| 6,233,448 B1 | 5/2001 | Alperovich et al. |
| 6,256,503 B1 | 7/2001 | Stephens |
| 6,421,544 B1 | 7/2002 | Sawada |
| 6,522,352 B1 | 2/2003 | Strandwitz et al. |
| 6,625,455 B1 | 9/2003 | Ariga |
| 6,690,940 B1 | 2/2004 | Brown et al. |
| 6,721,542 B1 | 4/2004 | Anttila et al. |
| 6,738,572 B2 | 5/2004 | Hunter |
| 6,823,199 B2 | 11/2004 | Gough |
| 6,832,093 B1 | 12/2004 | Ranta |
| 7,173,651 B1 | 2/2007 | Knowles |
| 7,290,288 B2 * | 10/2007 | Gregg et al. .................. 726/28 |
| 2001/0009855 A1 | 7/2001 | I'Anson |
| 2001/0051534 A1 | 12/2001 | Amin |
| 2002/0082002 A1 | 6/2002 | Fujii |
| 2002/0094805 A1 | 7/2002 | Yano et al. |
| 2002/0106202 A1 | 8/2002 | Hunter |
| 2002/0107032 A1 | 8/2002 | Agness et al. |
| 2002/0187818 A1 | 12/2002 | Kang |
| 2003/0078076 A1 | 4/2003 | Kuwajima et al. |
| 2003/0087631 A1 | 5/2003 | Diachina et al. |
| 2003/0134627 A1 | 7/2003 | Himmel et al. |
| 2003/0145228 A1 | 7/2003 | Suuronen et al. |
| 2004/0070670 A1 | 4/2004 | Foster |
| 2004/0087318 A1 | 5/2004 | Lipovski |
| 2004/0147255 A1 | 7/2004 | Lee |
| 2004/0166878 A1 | 8/2004 | Erskine et al. |
| 2004/0203842 A1 | 10/2004 | Hanninen et al. |
| 2004/0248597 A1 * | 12/2004 | Mathis ........................ 455/466 |
| 2004/0255048 A1 | 12/2004 | Lev Ran et al. |
| 2005/0007456 A1 | 1/2005 | Lee et al. |
| 2005/0064856 A1 | 3/2005 | Atkin et al. |
| 2005/0132048 A1 | 6/2005 | Kogan et al. |
| 2005/0192038 A1 | 9/2005 | Jeong |
| 2005/0256943 A1 | 11/2005 | Morris |
| 2006/0009265 A1 | 1/2006 | Clapper |
| 2006/0046714 A1 | 3/2006 | Kalavade |
| 2006/0046746 A1 * | 3/2006 | Ranford et al. ............ 455/456.5 |
| 2006/0069756 A1 | 3/2006 | Singh et al. |
| 2006/0094400 A1 * | 5/2006 | Beachem et al. .............. 455/410 |
| 2006/0094412 A1 | 5/2006 | Nonoyama et al. |
| 2006/0156385 A1 | 7/2006 | Chiviendacz et al. |
| 2006/0224742 A1 | 10/2006 | Shahbazi |
| 2006/0234678 A1 * | 10/2006 | Juitt et al. ..................... 455/411 |
| 2006/0265508 A1 * | 11/2006 | Angel et al. .................. 709/230 |
| 2006/0276200 A1 | 12/2006 | Radhakrishnan et al. |
| 2008/0043689 A1 * | 2/2008 | Walter .......................... 370/338 |
| 2008/0057977 A1 * | 3/2008 | Shostak ...................... 455/456.1 |
| 2008/0288330 A1 | 11/2008 | Hildebrand et al. |

FOREIGN PATENT DOCUMENTS

| | | |
|---|---|---|
| WO | WO-9749255 A1 | 12/1997 |
| WO | WO-9800809 A1 | 1/1998 |
| WO | WO-0067204 A2 | 11/2000 |
| WO | WO-0167748 A1 | 9/2001 |
| WO | WO-0201864 A1 | 1/2002 |
| WO | WO-02054200 A2 | 7/2002 |
| WO | WO-2004029836 A2 | 4/2004 |

* cited by examiner

FIG. 5 ary to a second user device based on a role of a second user. The first and second user devices are controlled using the first and second policies, which are different from each other.
METHODS, SYSTEMS, AND COMPUTER PROGRAM PRODUCTS FOR ROLE- AND LOCALE-BASED MOBILE USER DEVICE FEATURE CONTROL

CROSS REFERENCE TO RELATED APPLICATIONS

This application is a continuation of U.S. patent application Ser. No. 11/172,595 filed on Jun. 30, 2005; the entire contents of which is hereby incorporated by reference.

TECHNICAL FIELD

The subject matter described herein relates to controlling one or more features of a mobile user device, such as a mobile phone and/or a digital camera. More particularly, the subject matter described herein relates to methods, systems, and computer program products for role- and locale-based mobile user device feature control.

BACKGROUND

Mobile user devices, such as mobile telephones, mobile telephones that incorporate digital cameras, digital cameras with mobile telephone capabilities and digital cameras without corresponding mobile telephone capabilities, include a variety of features or functions that it may be desirable to control based on the role of a user of such a device and the locale in which the device is being used. For example, with regard to mobile telephones, it may be desirable to control ring volume, call duration, or other features based on the role of a user and the locale in which the device and user are positioned. With regard to digital cameras, in some locales, it may be desirable to control a camera's ability to flash or the duration allowed for recording video clips.

There are a variety of problems associated with controlling features of mobile user devices. One problem is that the user may not know of device usage policies particular to the user's role or the locale in which the device is being used. For example, in a museum, a user may not know the specific areas in which flash photography is permitted or prohibited. In another example, in some social settings, a user may not know whether pictures or mobile phone calls are acceptable.

Another problem associated with controlling features of a mobile user device is that a user may not know how to program the device to implement the policies of the user's role and locale. For example, mobile phones and digital cameras include vast menus of options. The user may not know how to navigate the menus and/or to control the options. In addition, even assuming that the user knows how to control the options of his or her device, the user may forget to reactivate disabled features when the user leaves a particular locale.

In light of these difficulties associated with controlling mobile user devices, methods have been developed for disabling functions of mobile user devices based on locale. For example, transmitters have been placed in restaurants to disable mobile phones. Such devices typically rely on a disable signal being sent to all devices within a particular area. One problem with such devices is that all user devices are treated the same, regardless of the role of the user. For example, in an office environment, it may be desirable to allow customers to make phone calls but to disable mobile communications capabilities for employees. A disabling device that treats all devices the same regardless of the user's role does not allow such exceptions.

Other user device feature control methods require specialized user equipment and action on the part of the user to comply with the policy. For example, one conventional method for controlling digital cameras requires that the camera have a card reader and requires that the user swipe a smart card through the card reader to disable camera features. Requiring specialized equipment and user action to comply with device usage policies decreases the likelihood that compliance will be achieved. Yet another problem with these conventional approaches is that finer grain control than disabling all devices or an entire feature of all devices is needed.

Accordingly, there exists a need for improved methods, systems, and computer program products for role- and locale-based mobile user device feature control.

DISCLOSURE

According to one aspect, the subject matter described herein includes a method for controlling at least one feature of a mobile user device based on a locale and a role of a user of the mobile user device. The method includes storing, in a database, role information defining a plurality of different roles assigned to different user types and corresponding locale-based mobile user device feature control policies. When the mobile user device is within a locale, the role of a user of the mobile user device is determined. A locale-based mobile device feature control policy corresponding to the role of the user is selected from the database. At least one feature of the mobile user device is controlled based on the locale-based feature control policy.

According to another aspect, the subject matter described herein includes a method for implementing role- and locale-based user device feature control at a user device. The method includes receiving information identifying a plurality of user roles. A role selection is communicated to a policy controller. A policy corresponding to the selected role is received from the policy controller. At least one feature of the mobile user device is controlled based on the policy.

According to yet another aspect, the subject matter described herein includes a method for applying different feature control policies to different user devices in the same locale. The method includes automatically communicating a first role- and locale-based feature control policy to a first mobile user device based on a role assigned to a first user. A second role- and locale-based feature control policy is automatically communicated to a second user device based on a role of a second user. The first and second user devices are controlled using the first and second policies, which are different from each other.

According to yet another aspect, the subject matter described herein includes a method for implementing role- and locale-based mobile user device feature control at a role- and locale-based policy controller. The method includes, at the policy controller, receiving role requests from mobile user devices. Policies corresponding to the role requests are determined. The policies are communicated to the user devices.

According to yet another aspect, the subject matter described herein includes a system for role- and locale-based user device feature control. The system includes a mobile user device feature control policy database for storing locale-based mobile user device feature control policies and corresponding mobile user roles. A role- and locale-based policy controller determines a role of a user of a mobile device, extracts a corresponding policy from the database, and communicates the policy to the mobile user device.

According to yet another aspect, the subject matter described herein includes a user device for implementing role- and locale-based feature control. The user device includes a feature control client for obtaining information identifying a plurality of user roles, for communicating a selected role to a policy controller and for obtaining a user device feature control policy corresponding to the selected role. The user device also includes a feature controller for controlling at least one feature of the device based on the user device feature control policy.

The subject matter described herein may be implemented using a computer program product comprising computer executable instructions embodied in a computer readable medium. Exemplary computer readable media suitable for implementing the subject matter described herein include chip memory devices, disk storage devices, programmable logic devices, application specific integrated circuits, and downloadable electrical signals. In addition, the computer readable medium used to implement the subject matter described herein may be located on a single device or computing platform or may be distributed across a plurality of devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
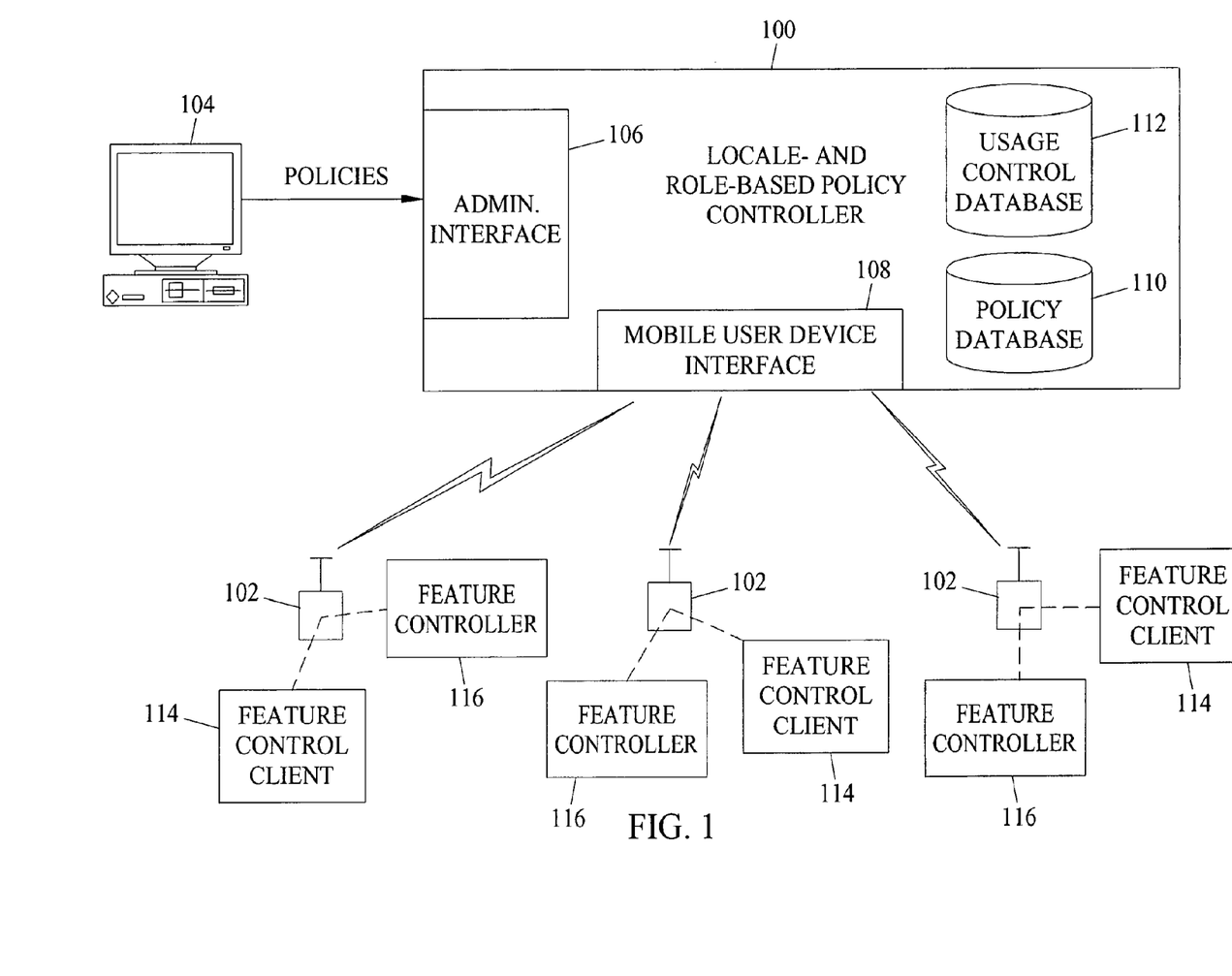
FIG. 1 is a block diagram illustrating a system for role- and locale-based mobile user device feature control according to an embodiment of the subject matter described herein.

FIG. 1 illustrates a system for role- and locale-based feature control of a user device according to an embodiment of the subject matter described herein. Referring to FIG. 1, the system includes means for storing, in a database, role information identifying a plurality of roles and corresponding locale-based mobile user device feature control policies. For example, the system includes a role- and locale-based policy controller 100 for storing role- and locale-based user device feature control policies and communicating the policies to mobile user devices 102. The system may also include means for determining a role of a mobile device user. For example, users may manually select roles via their user devices and communicate the selected roles to policy controller 100. Alternatively, policy controller 100 may receive authentication information from users via their respective user devices 102 from which policy controller 100 may derive role information. The system may further include means for selecting, from a database, a locale-based mobile user device feature control policy. For example, policy controller 100 may select policies from database 112 (described below) based on a role identified for a user. The system may further include means for controlling a feature of a user device based on the locale-based feature control policy. For example, each user device 102 may control one or more of its features based on a policy received from policy controller 100.

Policy controller 100 may receive policies from an administrator via administrator terminal 104. In the illustrated example, role- and locale-based policy controller 100 includes an admin interface 106 for interfacing with an administrator terminal 104, a mobile user device interface 108 for interfacing with mobile user devices 102, a mobile user device feature control policy database 110 for storing mobile user device feature control policies, and a simultaneous feature usage control database 112 for storing data relating to simultaneous-use-controlled features. Admin interface 106 may be any suitable interface for communicating with another terminal via a network using any suitable protocol. In one exemplary embodiment, admin interface 106 may be a web interface. Mobile user device interface 108 may be any suitable interface for communicating with mobile user devices over a wireless communications link. For example, mobile user device interface 108 may be a wireless LAN (WLAN) interface, a code division multiple access (CDMA) wireless interface, time division multiple access (TDMA) wireless interface, a frequency division multiple access (FDMA) wireless interface, or a Bluetooth wireless interface.

Mobile user device policy control database 110 stores locale-based policies that are indexed by user roles. Exemplary locales and roles for which policies may be defined include the following:

1) Enterprises where employees are trusted but may not realize which set of rules apply regarding device usage or may make inadvertent mistakes due to the complexity of the rules involved. For example, if mobile device 102 is a phone, the ring volume may be set too high for an office or too low for a cafeteria. Alternatively, during the CEO's presentation in an all hands meeting or during a customer visit, a phone ringing or buzzing may be acceptable if the call relates to a childcare emergency or a customer, but not otherwise. Database 110 may store ring volumes corresponding to each locale and role so that the ring volume can be set appropriately based on locale and role.

2) Social settings, such as museums, concert halls, or churches, where people may be embarrassed by non-compliance with mobile user device feature control policies and would greatly appreciate help in ensuring that their behavior complies with the expected standard. For example, if ringers or flashers are prohibited, most people may not desire to break the rules. Alternatively, people may forget that rules apply or how to comply with them due to the complexity of settings needed on their devices. In a museum, for instance, pictures may be permitted in a lobby, on a roof, or a balcony, permitted without flash in most rooms and prohibited where some special objects, such as light-sensitive paintings or other special artifacts, are kept. A duly authorized media organization photographer may be allowed to take pictures in some rooms, however, even if museum visitors are not. In order to implement such feature control, database 110 may store policies that allow camera flashes to be used in certain sub-areas within a locale but not in others and by users having certain roles, but not by other users.

3) Public settings, such as airports and train stations, where most people comply with user device feature control rules but may mistakenly fail to comply with some rules. In some such places, taking pictures or taking high-resolution pictures is not allowed for security reasons. Taking pictures looking out a plane or train window is generally allowed when the plane in question is no longer parked at an airport or train station. In order to control mobile user device features in such locales, database 110 may store policies that limit camera resolution or that limit all photographs within a predetermined distance of an airport terminal.

4) Tourist settings, such as bridges and scenic overlooks. Pictures are often forbidden in certain such settings, especially close to major bridges or some national monuments. However, pictures may be allowed in other such settings. In order to control mobile user device features in locales in which photography is limited, database 110 may store policies that limit photography within a predetermined distance of the object or by predetermined user types.

5) Educational institutions, such as schools and universities, where it is often essential for students to make and receive calls and send and receive instant messages. However, there are times when such actions cannot be permitted (e.g., during class or during exams). There are times when such actions can be permitted (e.g., during lunch or after school or in a pick up and drop off area). Also, the roles of teacher, student, and visiting parent may be used to determine who can make calls, take pictures, or make the video recordings. In order to implement such feature control, database 110 store policies for different areas and user types within an educational locale.

For each locale, policies may be indexed according to role. For example, if the location is a company, exemplary roles may be employee, guest, customer, and administrator. If the locale is an educational institution, the roles may be student, guest, faculty member, etc. Each role may be associated with a different user based policy for the locale. For example, if device 102 is a digital camera and the locale is a museum, guests may be given non-flash-photography privileges, while members of a media organization and museum employees may be given flash photography privileges. Dividing policies within a locale based on user roles enhances the utility of mobile user devices over such utility in locales where conventional feature control measures that block features for users regardless of the user type are utilized.

Table 1 shown below illustrates exemplary data that may be stored in database 110 for cameras and mobile phones.

TABLE 1

Role- and Local-based Mobile User Device Feature Control Policies

| Locale | Sub-Area | Role | Policy |
|---|---|---|---|
| museum | painting gallery | guest | no flash photography |
| | | authorized media member | flash photography allowed |
| | lobby | any | flash photography allowed |
| corporation | conference room | employee | ringer set on vibrate |
| | | customer | maintain default settings |
| | cafeteria | any | increase ring volume |
| educational institution | classroom | student | no communications during tests |
| | | teacher | silent communications enabled during tests |
| | common areas | any | all communications enabled |

It should be noted that in Table 1, policies for different locales are included. However, at any given locale, database 110 may only be populated with roles and corresponding policies specific to the locale. Alternatively, database 110 may store a set of default policies for a plurality of different locales. When a policy controller is activated in a given locale, the administrator may enable policies that apply to the particular locale, while leaving the remaining policies disabled. In addition, the administrator may create new policies and modify the default policies using admin interface 106.

Simultaneous feature usage control database 112 stores data regarding the number of users that are simultaneously using a given feature and pending requests to use the feature that have not been granted. Some features, even though allowed for a given locale and user role, may require permission from policy controller 100 for activation to limit the number of users simultaneously activating the same feature in the locale. For example, if user device 102 is a camera, it may be desirable to limit the number of simultaneous video recordings being made, even though video recording is allowed for a particular user role and locale. In order to implement such a feature, simultaneous feature usage control database 112 tracks the number of users activating a feature. If at any given time the number of feature activation requests meets or exceeds the allowed number of requests, new requests may be denied and stored in database 112 until the requests can be granted. Once a request is granted, the usage count for a given feature may be incremented and any pending request data for that request may be removed.

Table 2 shown below illustrates exemplary request data that may be stored in database 112 to control the number of users that are simultaneously activating a particular feature.

TABLE 2

Simultaneous User Feature Control Data

| Feature ID | Max Simultaneous Users | Current User Count | Current User ID/Feature Activation Time | Pending Request Data |
|---|---|---|---|---|
| Video recording | 10 | 10 | User1@isp.com/09:00.15<br>User2@isp.com/09:00.43<br>User3@isp.com/09:00.50<br>User4@isp.com/09:00.55<br>User5@isp.com/09:02.11<br>User6@isp.com/09:02.32<br>User7@isp.com/09:03.05<br>User8@isp.com/09:04.11<br>User9@isp.com/09:04.17<br>User10@isp.com/09:05.03 | User11@isp.com |

The data contained in Table 2 includes the feature ID, the number of current users, the maximum number of simultaneous users allowed, the IDs and feature activation times of current users, and the IDs of requesting users. In the illustrated example, there are 10 current users, the maximum number of simultaneous users allowed is 10, and there is one user waiting to use the feature. In some implementations, it may be desirable to limit the duration of usage by current users to prevent the current users from monopolizing a feature when others are waiting. Storing the user ID and feature activation time allows policy controller 100 to disable a feature being used by one user by sending a disable message to the user when the feature has been activated for the maximum allowed time period. Once the feature is disabled for one user, that user's ID may be removed from the table, the current user count may be decremented, and the pending user may be sent an enable message. The pending user's ID would then be moved to the current users field.

Mobile user devices 102 may be any mobile user devices with one or more features that it is desirable to control. Examples of mobile user devices 102 include digital cameras, mobile telephones, mobile telephones with digital camera features, digital cameras with mobile telephone features, etc. In the example illustrated in FIG. 1, each mobile user device 102 includes a feature control client 114 for communicating with role- and locale-based policy controller 100 and a feature controller 116 for controlling at least one feature of user device 102 using policies obtained by client 114. Feature control clients 114 may use any suitable protocol for communicating with locale and roll based feature controller. Exemplary protocols may include WLAN protocols, Bluetooth protocols, CDMA, TDMA, or FDMA air interface protocols, etc. In one exemplary implementation, feature control clients 114 may obtain information identifying a plurality of user roles and communicate a selected role to policy controller 100. Feature control clients 114 may also obtain a user device feature control policy corresponding to the selected role from policy controller 100.

Feature controllers 116 may read policy information obtained by clients 114 and control features of mobile user devices 102. Exemplary features that may be controlled include calling ability, ring volume, camera flash ability, flash intensity, etc.

Figure 2A:
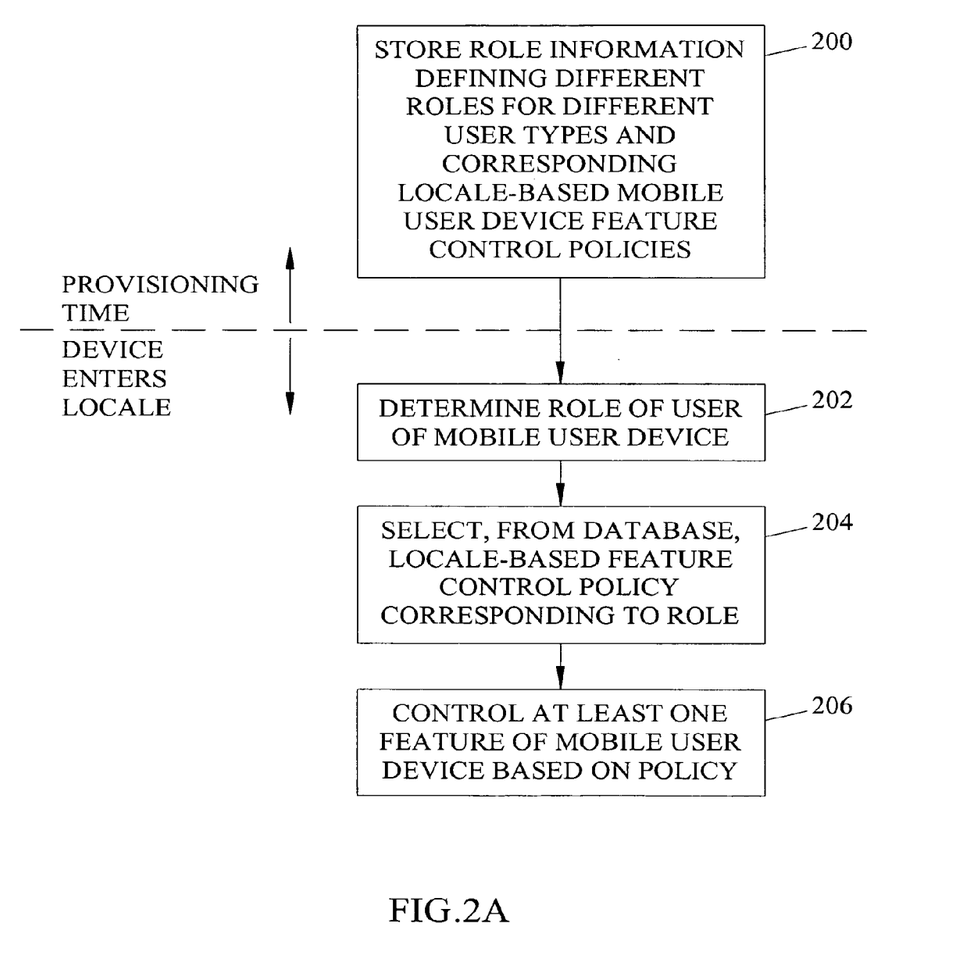
FIG. 2A is a flow chart illustrating an exemplary process for controlling a feature of a mobile user device based on a locale of the user device and a role assigned to the mobile user device user according to an embodiment of the subject matter described herein.

FIG. 2A is a flow chart illustrating an exemplary process for implementing role- and locale-based mobile user device feature control according to an embodiment of the subject matter described herein. Referring to FIG. 2A, in block 200, role information defining different roles for different user types and corresponding locale-based mobile user device feature control policies are stored in policy database 110. The action in block 200 may be performed at provisioning time before a user device enters a locale. The actions in blocks 202-206 may be performed after or in response to a user device entering a locale. Referring to block 202, the role of the mobile user device is determined. The role may be determined by communication between user device 102 and policy controller 100. Details of exemplary communication methods that may be used will be described below. In block 204, policy controller 100 selects, from a database, a locale-based feature control policy corresponding to the role. This role or a plurality of roles and a plurality of policies may be communicated to user device 102. In block 206, at least one feature of the device is controlled based on the policy. In one exemplary implementation, a user may be presented with a plurality of roles and corresponding policies and the user may select one of the roles and corresponding policies. In an alternate implementation, the role and policy may be selected automatically, for example, based on authentication parameters, such as a smart card or a user ID and password, supplied by the user.

Figure 2B:
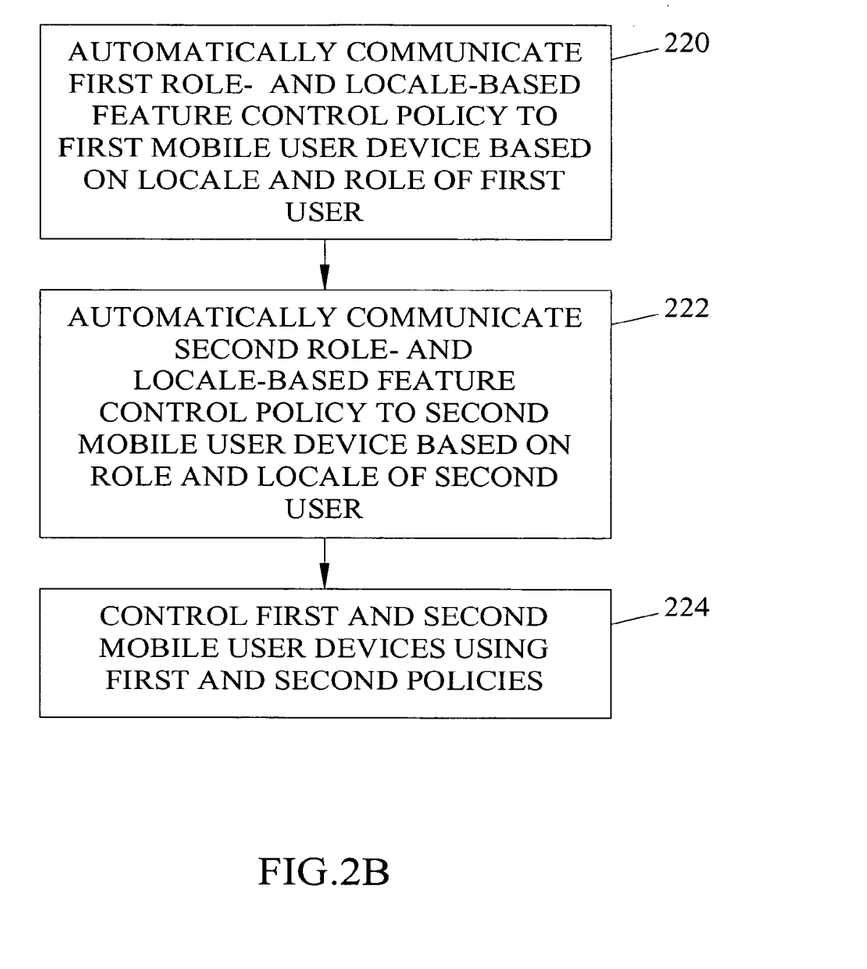
FIG. 2B is a flow chart illustrating an exemplary process for applying different mobile user device feature control policies to different mobile user devices in the same locale based on different user roles according to an embodiment of the subject matter described herein.

Because feature control policies are individually negotiated with each mobile user device and mobile user, different feature control policies can be applied to different users within the same locale. FIG. 2B is a flow chart illustrating an exemplary process of applying different policies for different mobile user devices within the same locale based on the locale and role of each user. Referring to FIG. 2B, in step 220, policy controller 100 automatically communicates a first role- and locale-based feature control policy to a first mobile user device based on a locale of a first user. Automatically communicating a policy to a user device may include sending the policy to the user device over an air interface in response to identifying the user's role. If the user's role is not identified, a default policy may be automatically communicated to the user device. User-compliance actions, such as swiping a smart card in the user device to receive the policy are not required.

In block 222, policy controller 100 automatically communicates a second role- and locale-based feature control policy to a second mobile user device based on a role and locale of the second user. In block 224, the user devices control their respective operation based on the first and second policies. If the locale of the first and second user devices is the same and the role of the first and second users is different, the first and second policies may be different. Thus, the subject matter described herein allows different role- and locale-based feature control policies to be used for different user devices within the same locale.

It should be noted that the subject matter described herein is not limited to applying different policies to different user devices in the same locale. If the two users have the same role, the users may be assigned the same policy. In addition, if the two users have different roles, but the same policy is associated with the different roles, the same policies may be applied to both user devices. It should also be noted that any of the methods described herein can be repeated to determine the policy to apply to any number of user devices.

Figure 3A:
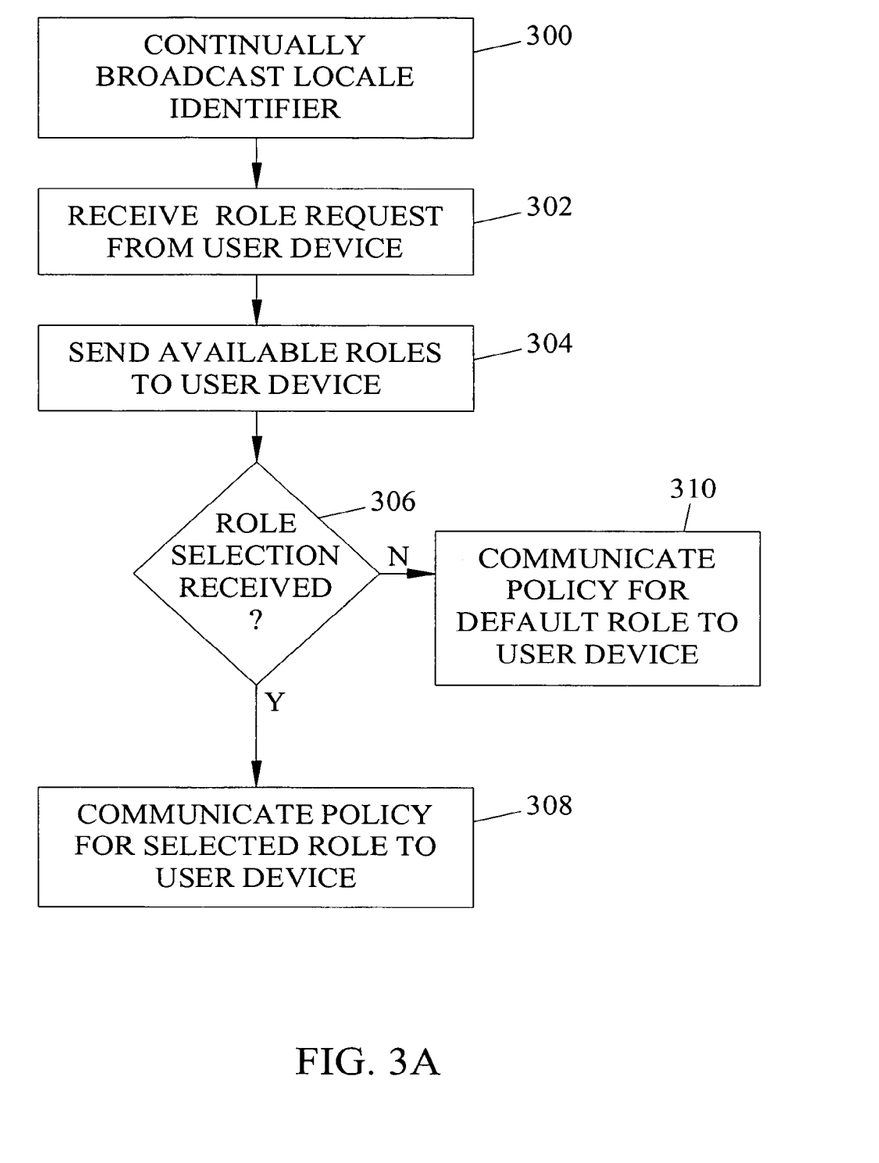
FIG. 3A is a flow chart illustrating an exemplary process that may be performed by a role- and locale-based policy controller in controlling a feature of a mobile user device according to an embodiment of the subject described herein.

FIG. 3A is a flow chart illustrating an exemplary process that may be performed by policy controller 100 in implementing role- and locale-based mobile user device feature control according to an embodiment of the subject matter described herein. Referring to FIG. 3A, in block 300, policy controller 100 continually broadcasts a locale identifier. For example, the locale identifier may be repeatedly broadcast at administrator-specified intervals. It should be noted that the action in block 300 is optional, and, in an alternate implementation, it is not required that the mobile user device be informed of the locale in which it is operating. In block 302, policy controller 100 receives and processes policy requests from user devices. In block 304, policy controller 100 sends available roles to the user device.

Once the user device receives the available roles, the user device may select an available role, either automatically or based on a user selection. In block 306, policy controller 100 determines whether a role selection has been received. If a role selection has been received, control proceeds to block 308 where policy controller 100 communicates a policy corresponding to the selected role to the user device. In block 306, if a role selection is not received within a predetermined time period, policy controller 100 may communicate a default policy to the user device in block 310. In one exemplary implementation, the default policy may be the policy corresponding to the most restrictive user role.

Figure 3B:
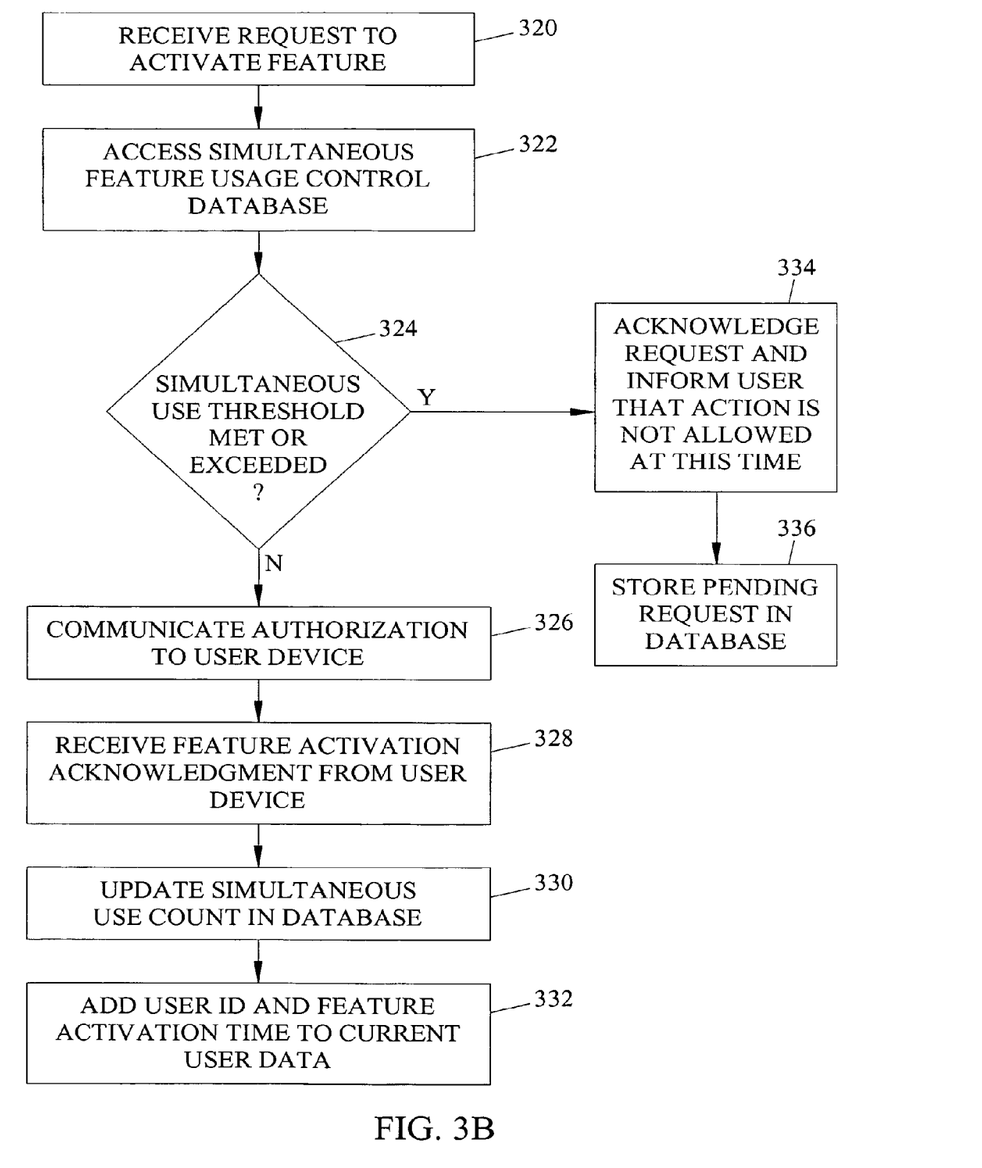
FIG. 3B is a flow chart illustrating an exemplary process that may be performed by a role- and locale-based policy controller in controlling the number of devices simultaneously activating the same feature according to an embodiment of the subject matter described herein.

As stated above, another aspect of policy controller 100 may include controlling the number of users allowed to simultaneously use a given feature within a locale, even when the feature is allowed for the user's role within the locale. FIG. 3B illustrates an exemplary process that may be implemented by policy controller 100 in limiting the number of users that can simultaneously use a given feature. Referring to FIG. 3B, in block 320, policy controller 100 receives a request to activate a feature whose simultaneous use is controlled. In block 322, policy controller 100 accesses simultaneous feature usage control database 112. In block 324, policy controller 100 determines whether allowing the requesting device to use the feature would cause the simultaneous use threshold to be met or exceeded. If the threshold would not be met or exceeded, control proceeds to block 326 where policy controller 100 communicates authorization to use the feature to the user device.

In block 328, policy controller 100 receives a feature activation acknowledgement message from the user device. Control then proceeds to block 330 where policy controller 100 increments the simultaneous use count in database 112. In block 332, policy controller 100 adds the user ID and feature activation time to the current use data in database 112. In step 328, if no feature authorization acknowledgement is received, policy controller 100 does not add the user ID and feature activation time to current use data in database 112. An unacknowledged feature activation may occur when a feature is authorized for a user device, and then the user device goes out of range or becomes disabled before the activation is received and/or acknowledged. In this scenario, it is desirable that the disabled or out-of-range user device not prevent other user devices from using the feature. By refraining from storing the disabled user's data as a current user, resources will be preserved for future users.

Returning to block 324, if the current feature activation request would cause the current usage threshold to be met or exceeded, control proceeds to block 334 where policy controller 100 acknowledges the request and informs the user that the requested action is not allowed at this time. Control then proceeds to block 336 where policy controller 100 stores pending request data in database 112.

Figure 3C:
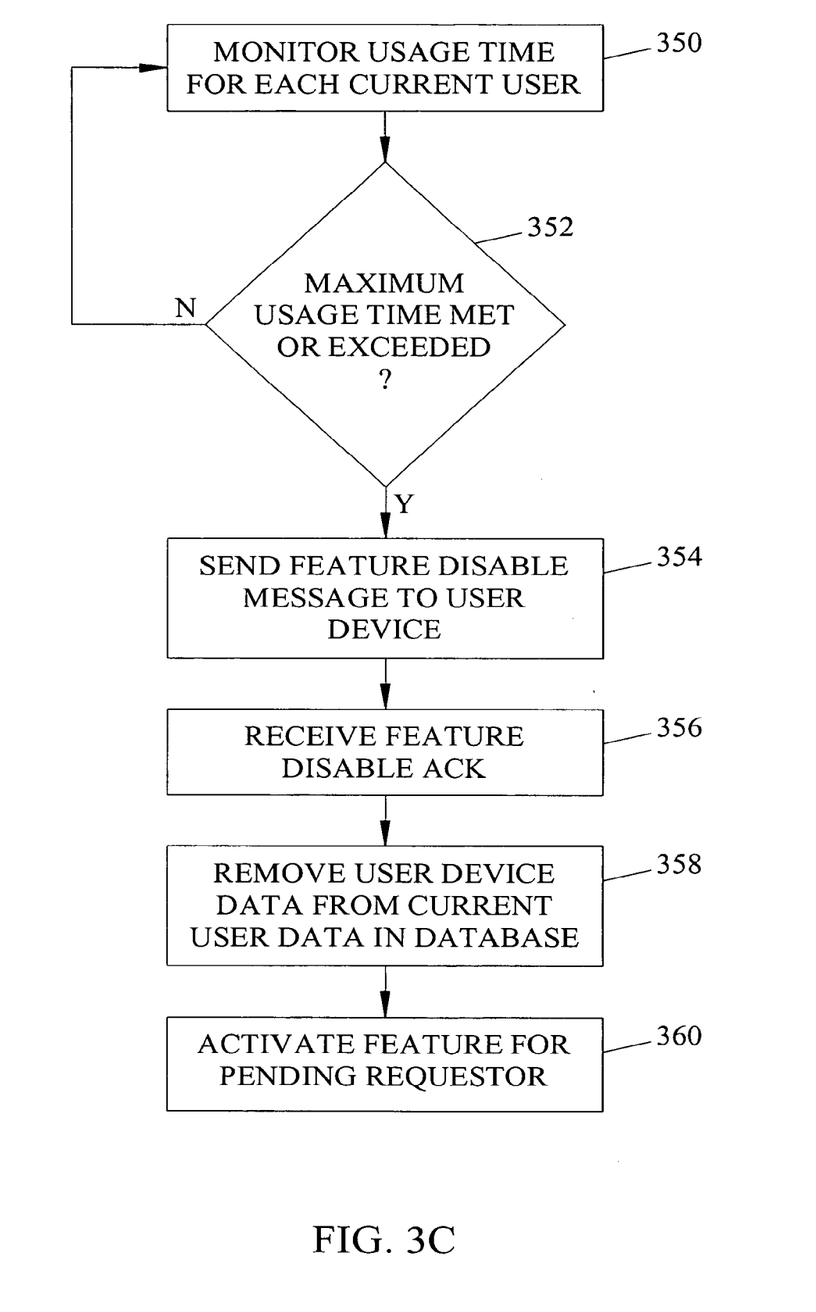
FIG. 3C is a flow chart illustrating an exemplary process that may be performed by a policy controller in limiting use duration of a simultaneous-use-controlled feature of a user device according to an embodiment of the subject matter described herein.

Once the maximum number of users for a given feature is achieved and pending request data is stored in database 112 indicating that requestors are waiting to use the feature, it may be desirable to limit the duration that current users can use the feature so that pending requestors can access the feature. FIG. 3C illustrates an exemplary process may be performed by policy controller 100 in limiting the duration of feature use by existing feature users so that pending requestors will eventually be allowed to access the feature. Referring to FIG. 3C, in block 350, policy controller 100 monitors the usage time of each current user. In block 352 it is determined whether the maximum usage time for a given user has been met or exceeded. If the maximum usage time has not been met or exceeded, control returns to block 350 where policy controller 350 continually monitors the usage time for each user. For example, the entries in database 112 may be checked at administrator-defined intervals to determine whether the usage time for any of the users meets or exceeds a maximum usage time.

If the maximum usage time for a user has been met or exceeded, control proceeds to block 354 where a feature disable message is sent to a user device. In block 356, policy controller 100 receives a feature disable acknowledgement message from the user device. In block 358, policy controller 100 removes user device data from the current user data in database 112. Control then proceeds to block 360 where policy controller 100 activates the feature for a pending requestor. Activating the feature for a pending requestor may include sending a feature activation message to the user device of the pending requestor, receiving a feature activation acknowledgement message, moving the user device data from the pending request field in database 112 to the current user field in database 112, and storing the feature activation time in database 112. Thus, using the process illustrated in FIGS. 3B and 3C, policy controller 100 can control the number of devices that simultaneously use a given feature.

The process of FIG. 3C may be performed any time it is desirable to limit feature usage time by pending users. For example, it may be desirable to continually execute the process illustrated in FIG. 3C when there are zero or more pending requestors in database 112. Executing the process illustrated in FIG. 3C when there are zero pending requestors places an absolute limit on each user's usage time, which may be desirable for some features, such as video recording time. Executing the steps illustrated in FIG. 3C when pending requestors are present in database 112 places a finite limit on feature activation wait time.

In order to prevent users who are out of range from blocking requesting users, a procedure may be implemented to remove such users from database 112. Such a procedure may include continually monitoring heartbeat messages received from user devices. If a user device listed as a current user in database 112 fails to send a heartbeat message within a predetermined time period, the user device may be disabled or out of range. Accordingly, the policy controller may remove the user device from the current user data in database 112. In addition or in the alternative, the policy controller may add a feature deactivation time to the pending user's data to indicate that the feature has been deactivated for the pending user.

It may also be desirable to allow current users to manually discontinue using a feature and allow other users to use the feature before the maximum usage time elapses. In order to implement these capabilities, a user device may send a feature disable request message to the policy controller. In response to the feature disable request message, the policy controller may remove the requesting user from the current user data in database 112. The policy controller may also acknowledge the request to confirm with the user device that the request has been disabled. Any time a current user is removed from database 112 the feature may be enabled for a pending requestor. It should also be noted that a user device may send a feature disable request message in response to a feature activation message before the user device initiates activation of a particular feature.

Figure 4A:
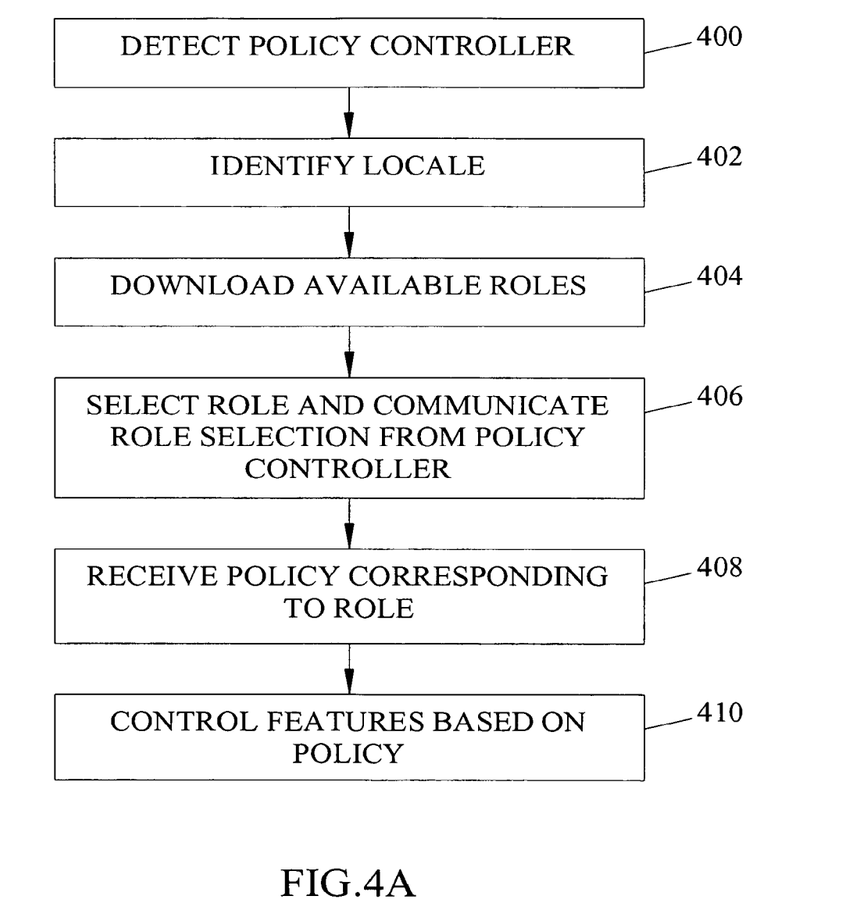
FIG. 4A is a flow chart illustrating an exemplary process that may be performed at a mobile user device in implementing role- and locale-based feature control according to an embodiment of the subject matter described herein.

FIG. 4A is a flow chart illustrating an exemplary process that may be performed by a user device 102 in implementing role- and locale-based feature control. Referring to FIG. 4A, in block 400, a user device detects a policy controller. This action may be performed by monitoring the air interface for locale ID broadcasts by policy controllers. Once a policy controller is detected, in block 402, the user device identifies the locale. As stated above, this action is optional. In block 404, the user device downloads available roles. In block 406, the user device selects one of the available roles and communicates the selected role to the policy controller. In block 408, the user device receives a policy corresponding to the role. In block 410, the user device controls its features based on the received policy.

Figure 4B:
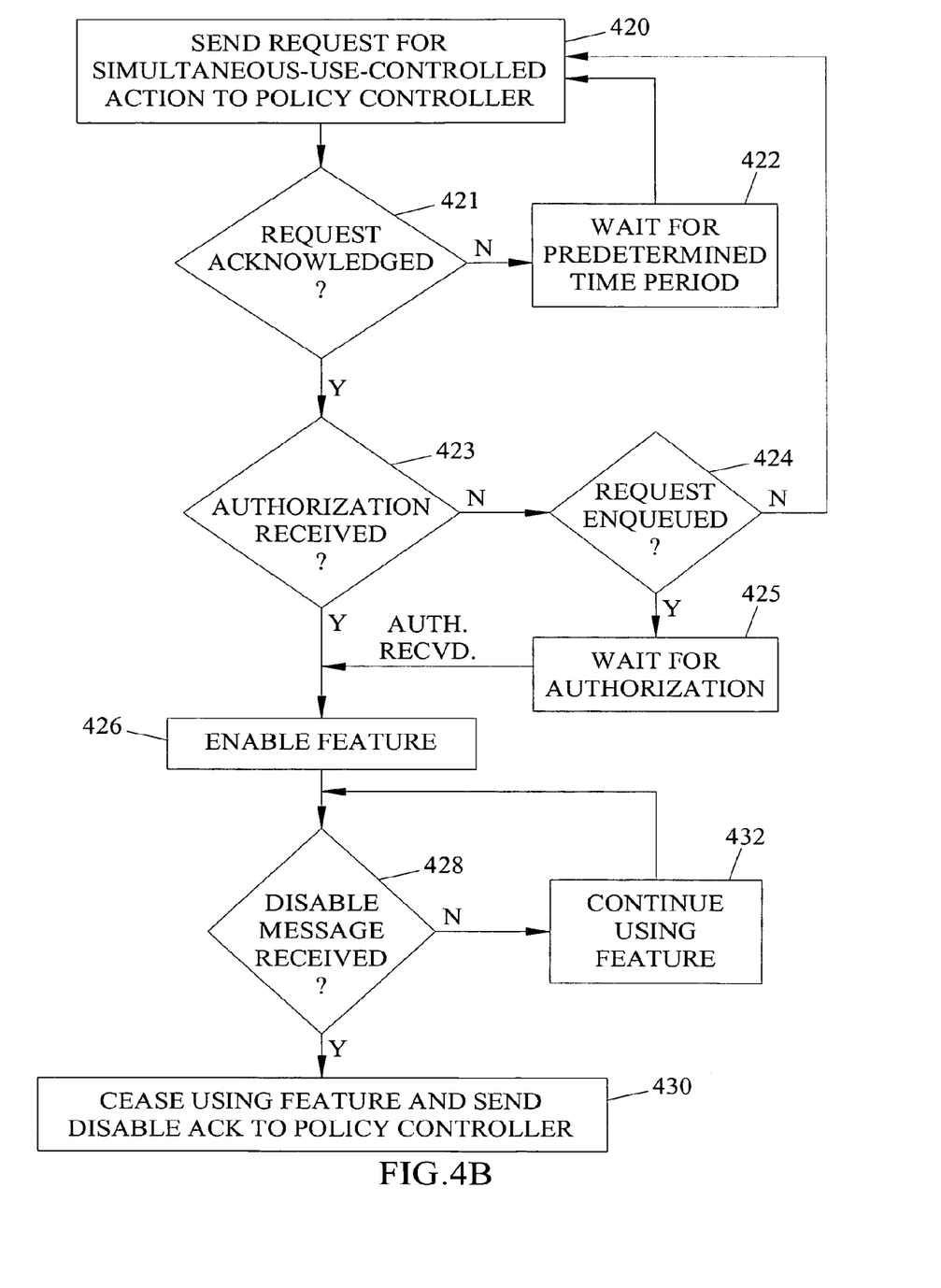
FIG. 4B is a flow chart illustrating an exemplary process that may be performed at a mobile user device in requesting activation of a feature whose simultaneous use by different users is limited according to an embodiment of the subject matter described herein.

FIG. 4B illustrates an exemplary process that may be performed by a user device in controlling activation of a feature for which policy controller 100 implements a simultaneous usage limit. Referring to FIG. 4B, in block 420, the user device sends a request to policy controller 100 for activating a feature for which the number of simultaneous users is controlled. In block 421 it is determined whether the request has been acknowledged. If the request has been not been acknowledged, control proceeds to block 422 where the user device waits for a predetermined time period and resends the request. If the request has been acknowledged, control proceeds to block 423 where the user device determines whether authorization has been received. If the authorization has not been received, control proceeds to block 424 where the user device determines whether the request has been enqueued for later granting due to the number of current simultaneous users. As illustrated above in Table 2, pending user data may be stored for users who have requested a feature but for whom the requests have not been granted. The policy controller may inform the user device that a request is pending and has been enqueued by sending a message to the user device. If such a message is received, the user device may wait for an authorization to be received for the pending request (block 425). If an authorization or a message indicating that a request has been enqueued is not received within a predetermined time period, control returns to block 420 where the user device resends the feature activation request.

In block 423 or block 425, if an authorization is received, control proceeds to block 426 where the user device enables the feature. Once the feature is enabled, the user may use the feature until a disable message is received. As described above with regard to FIG. 3C, policy controller 100 may send a disable message when the maximum number of users is currently using a feature, at least one pending request is present in database 112, and a current user's usage time exceeds an allowed limit. In block 428, the user device determines whether a feature disable message has been received. If a feature disable message has been received, control proceeds to block 430 where the user device disables the feature and sends a feature disable acknowledgement message to policy controller 100. In block 428, if a feature disable message has not been received, control proceeds to block 432 where the user continues using the feature. Control then returns to block 428 where the user device listens for feature disable messages. Thus, using the process illustrated in FIG. 4B, a user device can be controlled to limit simultaneous feature use.

Figure 5:
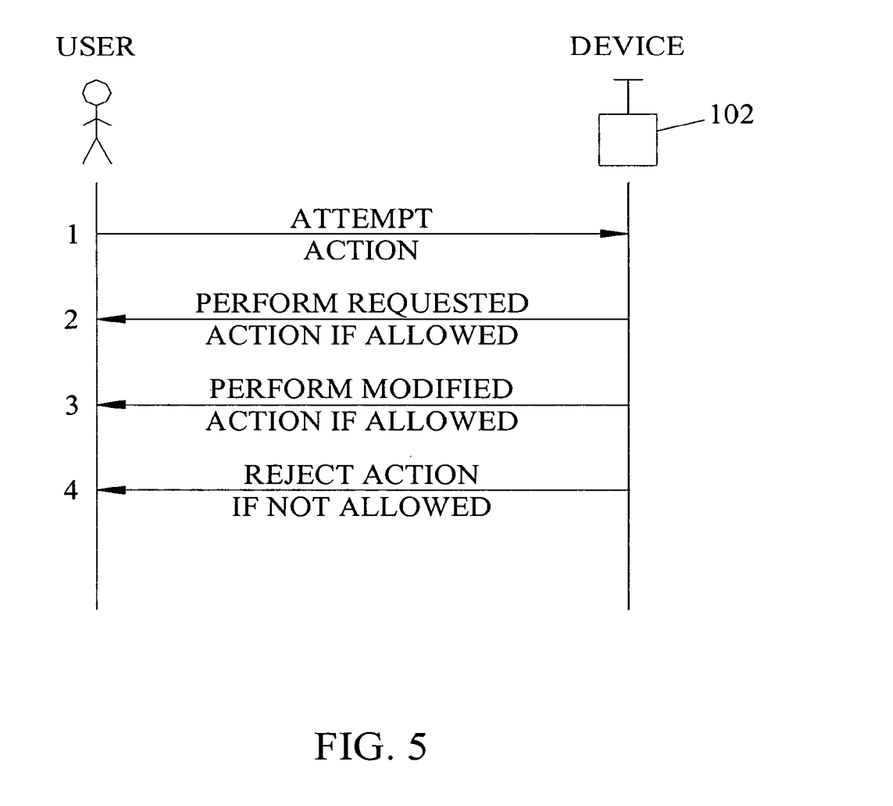
FIG. 5 is a flow diagram illustrating exemplary interaction between a user and a mobile user device that implements role- and locale-based feature control according to an embodiment of the subject matter described herein.

Controlling user device features based on a locale-based policy may include allowing or blocking a feature, or modifying a feature. FIG. 5 is a flow diagram illustrating exemplary action attempts by a user and corresponding device control actions that may be performed by a user device 102. Referring to FIG. 5, in line one, the user attempts an action. Based on the policy, device 102 may perform one of three actions. For example, in line two, device 102 performs the action if it is allowed. In line three, device 102 performs a modified action if it is allowed. In line four, user device 102 rejects the action if it is not allowed.

Enhancements

One potential enhancement to the methods and systems described above may include an override mechanism. For example, a user may have an override option on his or her user device to override a policy control. In emergency situations, it may be desirable for a user to be allowed to activate a phone or a camera. Such an override mechanism may be initiated by user by selecting an override menu option. The override menu option may override the control that was initiated by the policy controller.

Although many locales have been described above, the subject matter described herein is not limited to the particular locales described above. For example, sub-locales may be specified within a given locale.

In addition to the feature control options described above, another option for controlling devices that include cameras may include quarantining photographs at a server managed by the administrator of the locale. The pictures may also be quarantined at servers controlled by the owner of a given camera device. Examples of picture quarantine methods and other methods that may be used in combination with the methods and systems described herein are described in commonly-assigned, co-pending U.S. patent application Ser. No. 10/949,282, filed Sep. 24, 2004, the disclosure of which is incorporated herein by reference in its entirety.

Yet another set of enhancements may include subtleties of the policies that an administrator may set for a given locale. These enhancements may include:

1) Allow fine-grained actions, such as allowing users to make calls that are shorter than sixty seconds or make video clips that are shorter than thirty seconds. Likewise, a policy may allow the use of a camera flash but a) only at a low brightness or b) only for a specified number of pictures.
2) Base policies not only on a role, but also on additional considerations, such as the number of concurrent users of a feature, as described above.
3) Require a pre-registration phase so that users can purchase rights to a more flexible role. This can be a source of revenue for locale administrators.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for controlling at least one feature of the mobile user device based on a locale and a role of a user of the mobile user device, the method comprising:
   determining, based on role information provided by the mobile user device, a role of a user of the mobile user device;
   selecting a locale-based mobile user device feature control policy corresponding to the determined role of the user; and
   sending to the mobile user device the selected locale-based mobile user device feature control policy corresponding to the determined role of the user, the selected locale-based mobile user device feature control policy corresponding to the determined role of the user being configured to be processed at the mobile user device to control at least one feature of the mobile user device based on the selected locale-based feature control policy and the corresponding determined role of the user.

2. The method of claim 1, wherein said determining comprises defining roles for a plurality of different user types includes defining roles for employee and guest user types.

3. The method of claim 1 wherein said determining comprises:
   sending a plurality of roles to the user device; and
   receiving, from the user device, an indication of a selected role from the plurality of roles.

4. The method of claim 1 wherein said determining comprises:
   receiving authentication information supplied by the user; and
   selecting a role based on the authentication information.

5. The method of claim 1, further comprising:
   monitoring the number of current users that are using the at least one feature; and
   sending, in response to predetermined conditions including the number of current users, control information to at least one of the number of users to disable the at least one feature.

6. The method of claim 5, wherein the predetermined conditions include the amount of time that the individual users within the current number of users have been using the at least one feature.

7. The method of claim 1, further comprising:
   sending, to the mobile device, a plurality of roles specific to the locale; and
   receiving, from the mobile device, a selection of a role from the plurality of roles;
   wherein the role information subject to the determining comprises the received selected role.

8. A method for implementing role- and locale-based feature control policies at a mobile user device in response to the mobile user device being within a locale, the method comprising:
   at the mobile user device:
      selecting, from a plurality of roles for the locale, one of the roles;
      sending a role selection indicating the selected role from the mobile user device over the air interface;
      receiving a locale-based and role-specific mobile user device feature control policy corresponding to the selected role; and
      controlling a feature of the mobile user device by processing the locale-based and role-specific mobile user device feature control policy.

9. The method of claim 8, further comprising receiving from the locale, before the selecting, the plurality of roles.

10. The method of claim 8, wherein said selecting comprises automatically selecting based on authentication information within the user device.

11. The method of claim 8, wherein said selecting comprises manually selecting.

12. The method of claim 8, further comprising:
   receiving, at the mobile device and prior to the selecting, the plurality of roles.

13. A computer program product comprising computer executable instructions embodied in a non-transitory computer-readable medium for performing steps to control at least one feature of a mobile user device based on a locale and a role of a user of the mobile user device, comprising:
   code for determining, based on role information provided by the mobile user device, a role of a user of the mobile user device;
   code for selecting a locale-based mobile user device feature control policy corresponding to the determined role of the user; and
   code for sending to the mobile user device the selected locale-based mobile user device feature control policy corresponding to the determined role of the user, the selected locale-based mobile user device feature control policy corresponding to the determined role of the user being configured to be processed at the mobile user device to control at least one feature of the mobile user device based on the selected locale-based feature control policy and the corresponding determined role of the user.

14. The computer program product of claim 13, wherein said code for determining comprises code for defining roles for a plurality of different user types includes code for defining roles for employee and guest user types.

15. The computer program product of claim 13 wherein said code for determining comprises:
   code for sending a plurality of roles to the user device; and
   code for receiving, from the user device, an indication of a selected role from the plurality of roles.

16. The computer program product of claim 13 wherein said code for determining comprises:
   code for receiving authentication information supplied by the user; and
   code for selecting a role based on the authentication information.

17. The computer program product of claim 13, further comprising:
   code for monitoring the number of current users that are using the at least one feature;
   code for sending, in response to predetermined conditions including the number of current users, control information to at least one of the number of users to disable the at least one feature.

18. The computer program product of claim 17, wherein the predetermined conditions include the amount of time that the individual users within the current number of users have been using the at least one feature.

19. The computer program product of claim 13, further comprising:
   code for sending, to the mobile device, a plurality of roles specific to the locale; and
   code for receiving, from the mobile device, a selection of a role from the plurality of roles;
   wherein the role information subject to the determining comprises the received selected role.

20. A computer program product comprising computer executable instructions embodied in a non-transitory computer-readable medium for performing steps, for implementing role- and locale-based feature control policies at a mobile user device in response to the mobile user device being within a locale, comprising:

at the mobile user device:

code for selecting, from a plurality of roles for the locale, one of the roles;

code for sending a role selection indicating the selected role from the mobile user device over the air interface;

code for receiving a locale-based and role-specific mobile user device feature control policy corresponding to the selected role; and         code for controlling a feature of the mobile user device by processing the locale-based and role-specific mobile user device feature control policy.

21. The computer program product of claim 20, further comprising code for receiving from the locale, before execution of the code for the selecting, the plurality of roles.

22. The computer program product of claim 20, wherein said code for selecting comprises code for automatically selecting based on authentication information within the user device.

23. The computer program product of claim 20, wherein said code for selecting comprises code for receiving a manual selection.

24. The computer program product of claim 20, further comprising:

code for receiving, at the mobile device and prior to the selecting, the plurality of roles.

* * * * *